US008966879B1

(12) United States Patent
Munson

(10) Patent No.: US 8,966,879 B1
(45) Date of Patent: Mar. 3, 2015

(54) ACOUSTIC IGNITER

(75) Inventor: Scott M. Munson, Monona, WI (US)

(73) Assignee: Orbital Technologies Corporation, Madison, WI (US)

( * ) Notice: Subject to any disclaimer, the term of this patent is extended or adjusted under 35 U.S.C. 154(b) by 494 days.

(21) Appl. No.: 13/396,919

(22) Filed: Feb. 15, 2012

(51) Int. Cl.
*F02G 1/00* (2006.01)
*F02G 3/00* (2006.01)
*F02K 9/68* (2006.01)

(52) U.S. Cl.
USPC ........ 60/200.1; 60/39.821; 60/39.77; 60/258; 60/39.827; 60/204; 60/257

(58) Field of Classification Search
CPC ............. F02C 7/26; F02P 15/003; F02P 3/12; F02K 9/42; F02K 9/94; F02K 9/95
USPC ........... 60/39.821, 39.77, 200.1, 32.827, 204, 60/258, 257
See application file for complete search history.

(56) References Cited

U.S. PATENT DOCUMENTS

| | | | |
|---|---|---|---|
| 3,630,151 A | 12/1971 | Rakowsky | |
| 3,811,359 A | 5/1974 | Marchese et al. | |
| 3,982,488 A | 9/1976 | Rakowsky et al. | |
| 5,109,669 A | 5/1992 | Morris et al. | |
| 6,199,365 B1 * | 3/2001 | Pretorius et al. | 60/776 |
| 6,199,370 B1 * | 3/2001 | Kessaev et al. | 60/212 |
| 6,272,845 B2 * | 8/2001 | Kessaev et al. | 60/212 |
| 6,966,769 B2 | 11/2005 | Elvander et al. | |
| 2005/0053876 A1 | 3/2005 | Joos et al. | |
| 2007/0062176 A1 * | 3/2007 | Bendel | 60/204 |
| 2007/0204593 A1 * | 9/2007 | Cover et al. | 60/204 |
| 2008/0264372 A1 * | 10/2008 | Sisk et al. | 123/144 |
| 2009/0173321 A1 | 7/2009 | Horn et al. | |
| 2009/0293448 A1 * | 12/2009 | Grote et al. | 60/204 |
| 2010/0005779 A1 * | 1/2010 | Goislot | 60/258 |
| 2012/0317956 A1 * | 12/2012 | Di Salvo et al. | 60/204 |

FOREIGN PATENT DOCUMENTS

| | | |
|---|---|---|
| CN | 101782028 A | 7/2010 |
| SU | 1537967 A1 | 1/1990 |

OTHER PUBLICATIONS

Guoping Xia, Ding Li, and Charles L. Merkle, "Effects of a Needle on Shrouded Hartmann-Sprenger Tube Flows", AIAA Journal, vol. 45, No. 5, May 2007.

(Continued)

*Primary Examiner* — Craig Kim
(74) *Attorney, Agent, or Firm* — Stiennon & Stiennon

(57) ABSTRACT

An acoustic resonance igniter uses gas expanding through a nozzle to form a sonic, or under-expanded supersonic, jet directed against the opening of a blind resonance cavity in a central body, setting up a high-frequency sonic resonance which heats the gas within the cavity. A pintle extends coaxially with the nozzle and injects liquid propellant into the jet. The liquid propellant ignites with the heated gas within the resonance cavity forming combustion gases. The combustion gases flow through openings in a flange which supports the resonance cavity into a combustion chamber in the same direction as the gas jet flows. The liquid propellant is injected from within the support flange in the direction of combustion gas flow to film cool the combustion chamber wall and the flange and the central body supported by the flange. The acoustic resonance igniter may form a rocket engine ignition torch or a RCS thruster.

23 Claims, 3 Drawing Sheets

(56) References Cited

OTHER PUBLICATIONS

Bert R. Phillips and Albert J. Pavli, "Resonance Tube Ignition of Hydrogen-Oxygen Mixtures", NASA Technical Note, May 1971, NASA TN D-6354.

Mario Niwa, A. Santana, Jr., and Khoze Kessaev, Development of a Resonance Igniter for GO2/Kerosene Ignition, Journal of Propulsion and Power, vol. 17, No. 5, Sep.-Oct. 2001.

K. Kessaev, R. Vidal, M. Niwa, "Gas Jet Heat Release Inside a Cylindrical Cavity", International Journal of Heat and Mass Transfer, Aug. 14, 2002.

C.K.W. Tam and H.K. Tanna, "Shock Associated Noise of Supersonic Jets from Convergent-Divergent Nozzles", Journal of Sound and Vibration, Academic Press Inc., (London) Limited, 1982.

P. J. Robinson and E. M. Veith, "Development of a Flight-Type Exciter for a Spark-Initiated T.orch Igniter", NASA Johnson Space Center, Abstract No. 2008-0128AFE.

Guo-Zhou Zhang, Ya-Na Song, Nan-Jia Yu, Xiao-Yan Tong, and Bin Ma, "Coaxial Hydrogen/Oxygen Gas-Dynamic Resonance Ignition Technology for Rocket Repetitive Starting", Beijing University of Aeronautics and Astronautics.

V. P. Marchese and E. L. Rakowsky, L. J. Bement "A Fluidic Sounding Rocket Motor Ignition System", J. Spacecraft, vol. 10, No. 11, Nov. 1973.

Resonance Ignition diagrams and photographs from the Institute of Space Propulsion.

Article entitled "Thrust Chambers and Other Combustion Devices", p. 125.

Bert Phillips, Albert J. Pavli, and E. William Conrad, "A Resonance Igniter for Hydrogen-Oxygen Combustors", J. Spacecraft, vol. 7, No. 8, pp. 620-622, Feb. 13, 1970.

S. Murugappan and E. Gutmark, "Parametric Study of Hartmann-Sprenger Tube", p. 1, AIAA-2002-1012.

AF-M315A Resonant Igniter Ignition Tests.

Nicholas Pearson and William E. Anderson, "Acoustic Response of a Resonant Igniter with Confuser Inlet", Purdue University.

Dustin J. Bouch and A. D. Cutler, "Investigation of a Hartmann-Sprenger Tube for Passive Heating of Scramjet Injectant Gases", AIAA-2003-1275.

A. Hamed, K. Das and D. Basu, "Numerical Simulation and Parametric Study of Hartmann-Sprenger Tube Based Powered Device", AIAA-2003-0550.

M. Niwa, A. Santana, Jr., and K. Kessaev, "Modular Ignition System Based on Resonance Igniter", J. Propulsion, vol. 17, No. 5 pp. 1131-1133.

C. E. G. Przirembel, "Aerothermodynamic Aspects of an Axisymmetric Resonance Tube", AIAA Journal, vol. 18, No. 9, Sep. 1980, pp. 1141-1143.

C. E. G. Przirembel and L. S. Fletcher, "Aerothermodynamics of a Simple Resonance Tube", AIAA Journal, vol. 15, No. 1, Jan. 1977, pp. 101-104.

Vladimir Bazarov, Vladimir Rutovskii and Anton Khohlov, "Study of Atomization, Mixing and Combustion of Liquid and Gaseous Propellants in Crossed and Swirled Flows", 43rd AIAA/ASME/SAE/ASEE Joint Propulsion Conference & Exhibit, Jul. 8-11, 2007, p. 1.

Kevin Miller, James Sisco, Nicholas Nugent, and William Anderson, Experimental Study of Combustion Instabilities in a Single-Element Coaxial Swirl Injector' 41st AIAA.SME.SAE.ASEE joint Propulsion Conference & Exhibit, Jul. 10-13, 2005, pp. 1-15.

Julian Becker, "Breakup and Atomization of a Kerosene Jet in Crossflow at Elevated Pressure", Journal of the International Institutions for Liquid Atomization and Spray Systems, vol. 12, No. 1-3, pp. 363-383, 2002.

R. K. Cohn, P. A. Strakey, R. W. Bates and D. G. Talley, "Swirl coaxial Injector Development", 41st Aerospace Sciences Meeting and Exhibit, Jan. 6-9, 2003.

Matthew R. Long, Vladimir G. Bazarov, and William E. Anderson, "Main Chamber Injectors for Advanced Hydrocarbon booster Engines", 39th AIAA/ASME/SAE/ASEE Joint Propulsion Conference and Exhibit, Jul. 20-23, 2003.

S. Pal, M. D. Moser, H. M. Ryan, M. J. Foust and R. J. Santoro, "Shear Coaxial Injector Atomization Phenomena for Combusting and Non-Combusting Conditions", NASA-CR-193339.

Nicholas Pearson and William E. Anderson, "Acoustic Response of a Resonant Igniter with Confuser Inlet", AIAA Journal, vol. 46, No. 4, Apr. 2008.

Vincent P. Marchese, "Development and Demonstration of Flueric Sounding Rocket Motor Ignition", NASA CR-2418, Jun. 1974.

James M. Green, "A Premixed Hydrogen/Oxygen Catalytic Igniter", NASA-CR-185113, AIAA-89-2302, Jun. 1989.

M. Kurosaka, "Acoustic Streaming in Swirling Flow and the Ranque-Hilsch (vortex-tube) Effect", J. Fluid Mech., vol. 124, pp. 139-172, 1982.

L. Stabinsky, "Analytical and Experimental Study of Resonance Ignition Tubes" NASA CR 136934, Dec. 1, 1973, pp. 13-39.

\* cited by examiner

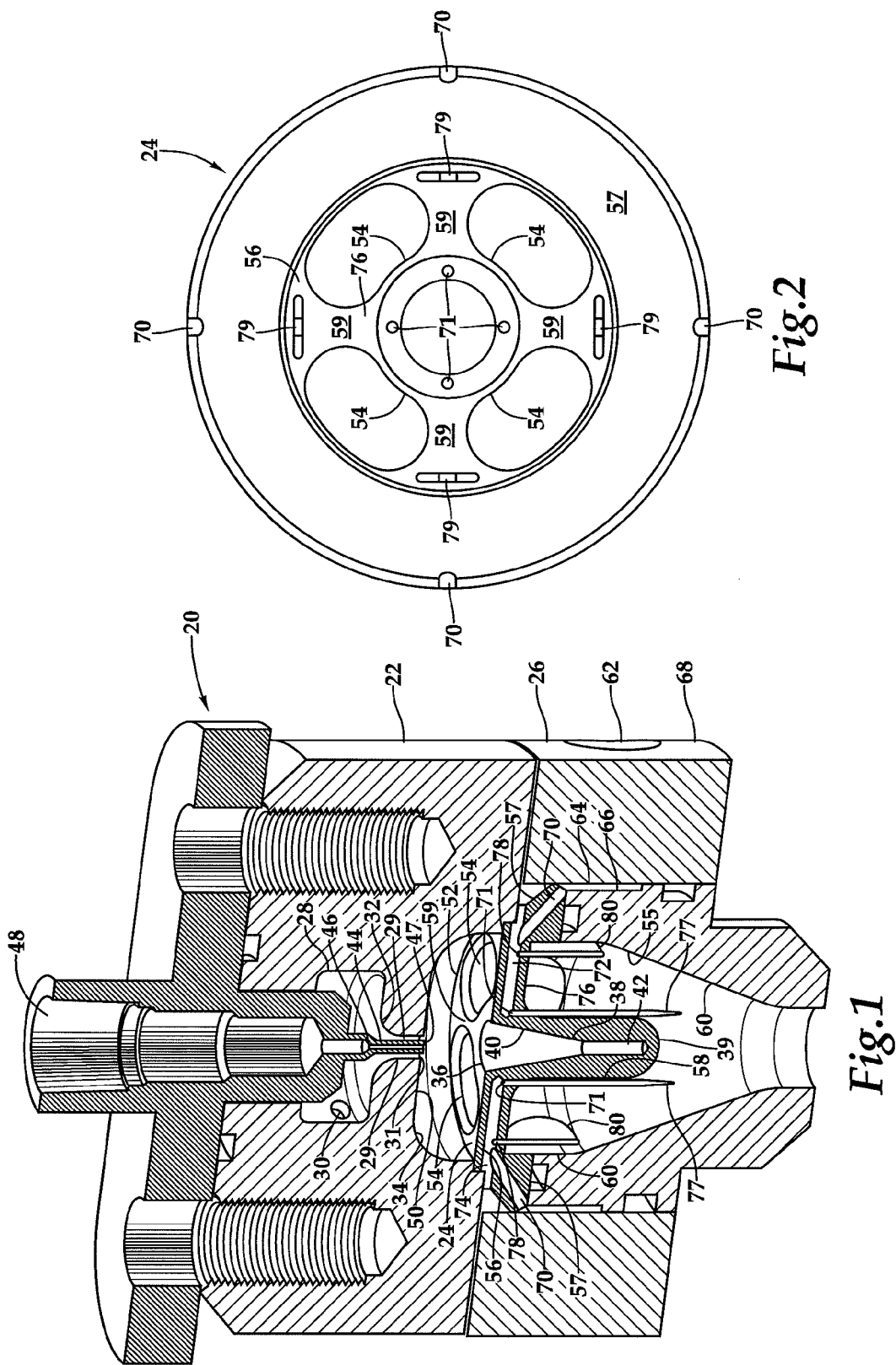

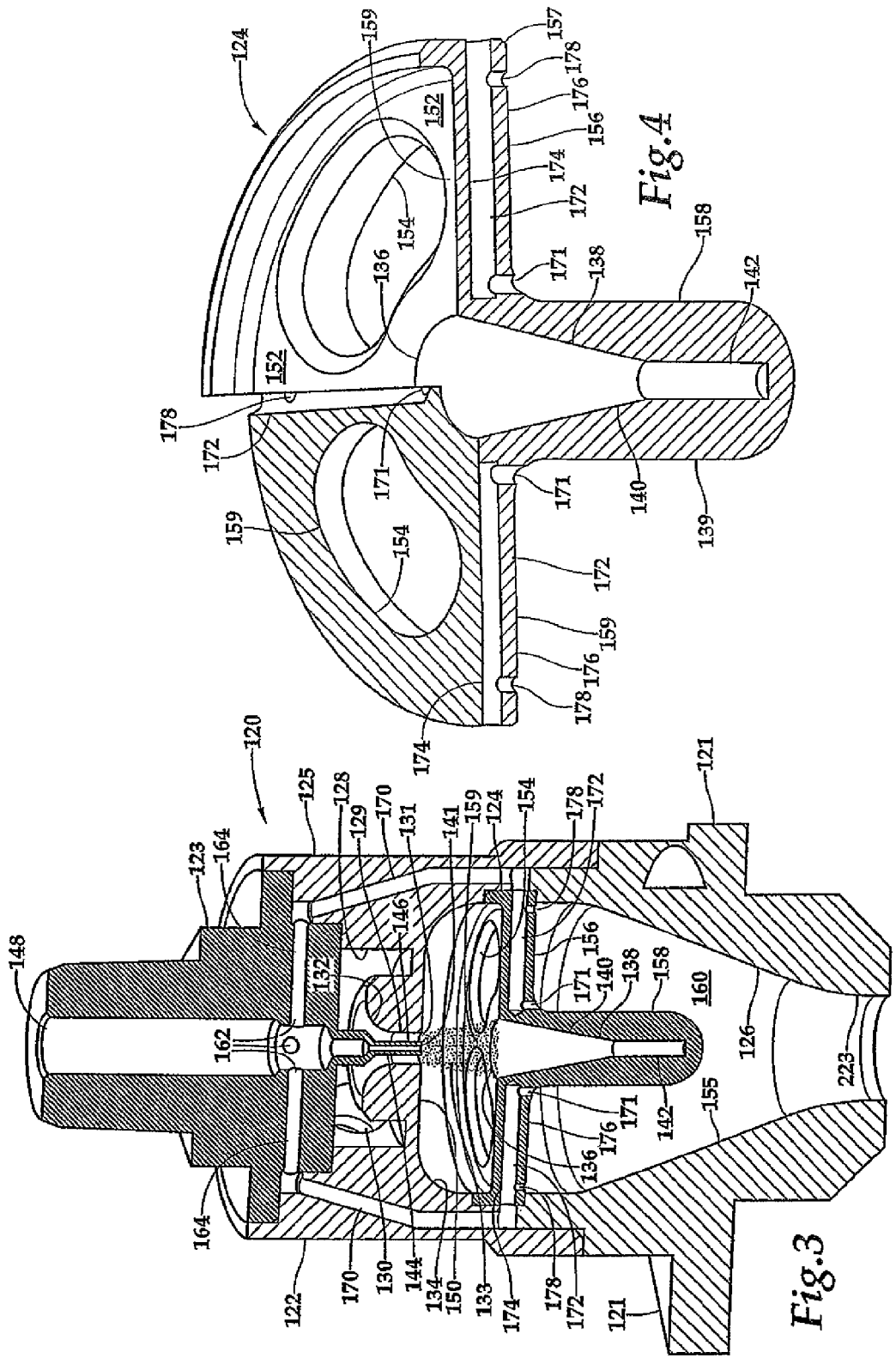

ACOUSTIC IGNITER

STATEMENT AS TO RIGHTS TO INVENTIONS MADE UNDER FEDERALLY SPONSORED RESEARCH AND DEVELOPMENT

This invention was made with government support under contract #FA9300-10-2105 awarded by Air Force Research Laboratory. The government has certain rights in the invention. The government may exercise such rights over assignee's objection in accordance with 35 U.S.C. 202 and 203 if the government finds such action necessary in accord with 35 U.S.C. 203(a)(1-4)

CROSS REFERENCES TO RELATED APPLICATIONS

Not applicable.

BACKGROUND OF THE INVENTION

The present invention relates to igniters such as used in rocket engines, jet engines and combustors in general, and to igniters utilizing acoustically heated gas as ignition sources in particular.

Generally the safest, most reliable and most widely used method of igniting a combustor which does not employ a pilot light is an electrical spark. This approach is generally reliable and safe, e.g., such as used in an internal combustion engine sparkplug. Historically however, igniters for rocket engines have often used a pyrotechnic igniter or hypergolic ignition to assure reliable engine ignition. Ignition is particularly a concern in liquid rocket engines where both the fuel and oxidizer are supplied as liquids to the chamber, because any momentary delay in ignition can result in the accumulation of an explosive mixture of fuel and oxidizer, resulting in a hard start which may damage or destroy the engine. Restartable rocket engines are often necessary where the engine is used to perform orbit circularization, orbital maneuvers, or orbital transfer. Multiple pyrotechnic igniters, one for each use of the engine, have been used. Reusable engines also require multiple starts, and, while replaceable pyrotechnic igniters are possible, they may leave residues which may add to the cost of reconditioning the engine for re-flight. Another approach to reliable ignition is to use propellants which are hypergolic (ignite on contact with each other) so that multiple restarts of the engine are not generally a problem. Hypergolic fuel combinations are widely used in rocket engines employed in missiles, rocket boosters, and/or maneuvering engines, in large part because they provide a simple and reliable ignition process. Non-hypergolic propellant combinations in rocket booster stages often use a limited quantity or slug of hypergolic propellant in one or both of the propellant lines or separately injected into the combustion chamber to initiate combustion. In such a case multiple starts becomes complicated. Although engines utilizing hypergolic propellants readily perform multiple restarts and are widely used, using hypergolic propellant combinations limits propellant choice and can limit performance. Moreover, generally hypergolic propellants are themselves expensive and toxic, such that the cost of procurement and handling may be seriously increased as compared to non-hypergolic propellants.

Electric spark ignition has been used to overcome these problems particularly with the hydrogen and oxygen propellant combination such as on the Pratt & Whitney RL 10 engine. Hydrogen and oxygen are clean burning, require low ignition energy, and have wide flammability limits. However, electrical ignition sources add complexity, require electrical power and a high-voltage electrical source, and are susceptible to electromagnetic damage such as caused by lightning strikes, and generally provide low ignition energy.

One possible ignition source which has been considered particularly for hydrogen and oxygen propellants is an acoustic igniter. An acoustic igniter employs a nozzle which directs an under-expanded sonic or supersonic gas jet into an essentially blind hole which forms an acoustic resonance tube. This arrangement, originally used as a high frequency noise source, was subsequently investigated as a simple way of obtaining a small quantity of very hot gas, which can be used as a source of ignition. Although low molecular weight and monatomic gases heat more rapidly and achieve higher temperatures, the feasibility of a diatomic gaseous oxygen\kerosene resonance igniter has been suggested by Mario Niwa, et al., in the *Journal of Propulsion and Power*, Vol. 17, No. 5, where it was recognized that kerosene has an advantage as an ignition fuel because part of the kerosene can be sprayed on the chamber wall and can help to cool the downstream wall.

What is needed is a practical acoustic resonance igniter for a broad range of propellants.

SUMMARY OF THE INVENTION

The acoustic resonance igniter of the present invention employs pressurized gas supplied to a manifold which exits through a nozzle to form a sonic or under-expanded supersonic jet. This pressurized gas is known as the driver gas. An essentially blind resonance cavity in an axially extending central body has an open end which is spaced from the nozzle in an ignition chamber and is positioned to receive the under-expanded jet. The jet of driver gas sets up a high-frequency sonic resonance which heats a small quantity of the gas within the resonance cavity through periodic shock waves that propagate the length of the cavity, reflect off of the closed cavity wall, and travel back towards the mouth of the cavity. The temperature of this gas can exceed 1200 Kelvin. A secondary propellant injector pintle extends through the driver gas manifold along the axis of the nozzle and injects liquid propellant into the gas jet. The high shear forces at the interface between the gas jet and the liquid jet atomize the liquid into small droplets which are carried into the resonance cavity which contains some amount of heated gas. The heated gas ignites with the secondary propellent droplets within the resonance cavity which ignites the remaining propellants in the ignition chamber. The combustion gases from the ignition chamber flow out through openings in a flange which supports the axially extending central body containing the resonance cavity. The openings allow combustion gases to flow out of the ignition chamber in the direction of and around the resonance cavity into a combustion chamber. Because of the highly off-stoichiometric ratio between the propellants within the ignition chamber, it is not necessary to actively cool the ignition chamber.

As the combustion gases flow out of the ignition chamber, additional liquid is injected to increase the combustion gases temperature by bringing the mixture ratio closer to stoichiometric, at the same time the liquid injection is arranged to provide regenerative cooling of the flange and film cooling of the interior of the combustion chamber and the exterior of the resonance cavity which is supported on the flange. The combustion gases at a selected mixture ratio exit the combustion chamber through a nozzle which provides a torch for igniting the main combustion chamber of a larger rocket engine or other combustion device. Alternatively, the combustion gases may exit through an expansion nozzle to form a reaction control system (RCS) thruster.

One embodiment of acoustic resonance igniter of this invention employs gaseous oxygen and kerosene or RP-1, and provides an ignition source for a liquid oxygen (LOX) RP-1 engine, or the basis for a gaseous oxygen/-RP-1 reaction control system (RCS) thruster. Other propellant combinations used in the acoustic resonance igniter ignition generally require one liquid and one gaseous propellant. The gas is heated in the resonance cavity, and liquid provides conductive cooling of the flange and film cooling of the interior of the combustion chamber and the exterior of the resonance cavity. Other propellant combinations include gaseous hydrogen and liquid nitrous oxide, gaseous oxygen and a liquid hydrocarbon such as ethanol, gaseous oxygen and liquid hydrogen, and gaseous hydrogen and liquid oxygen.

It is an object of the present invention to provide a non-electrical non-pyrotechnic non-hypergolic ignition source for a rocket engine or RCS thruster.

It is a further object of the present invention to provide a reusable and reliable method for igniting a wide range of propellant combinations.

It is another object of the present invention to provide a RCS bipropellant system which is non-hypergolic.

It is a yet further object of the present invention to provide a practical rocket engine acoustic igniter.

Further objects, features and advantages of the invention will be apparent from the following detailed description when taken in conjunction with the accompanying drawings.

BRIEF DESCRIPTION OF THE DRAWINGS

FIG. 1 is an isometric cross-section view of the acoustic resonance igniter of this invention.

FIG. 2 is a bottom plan view of the resonance cavity subassembly of the acoustical resonance igniter of FIG. 1.

FIG. 3 is a cross-sectional view of the resonance igniter of FIG. 1.

FIG. 4 is a multiple cross-sectional view of the resonance subassembly of FIG. 3.

DESCRIPTION OF THE PREFERRED EMBODIMENTS

Figure 5:
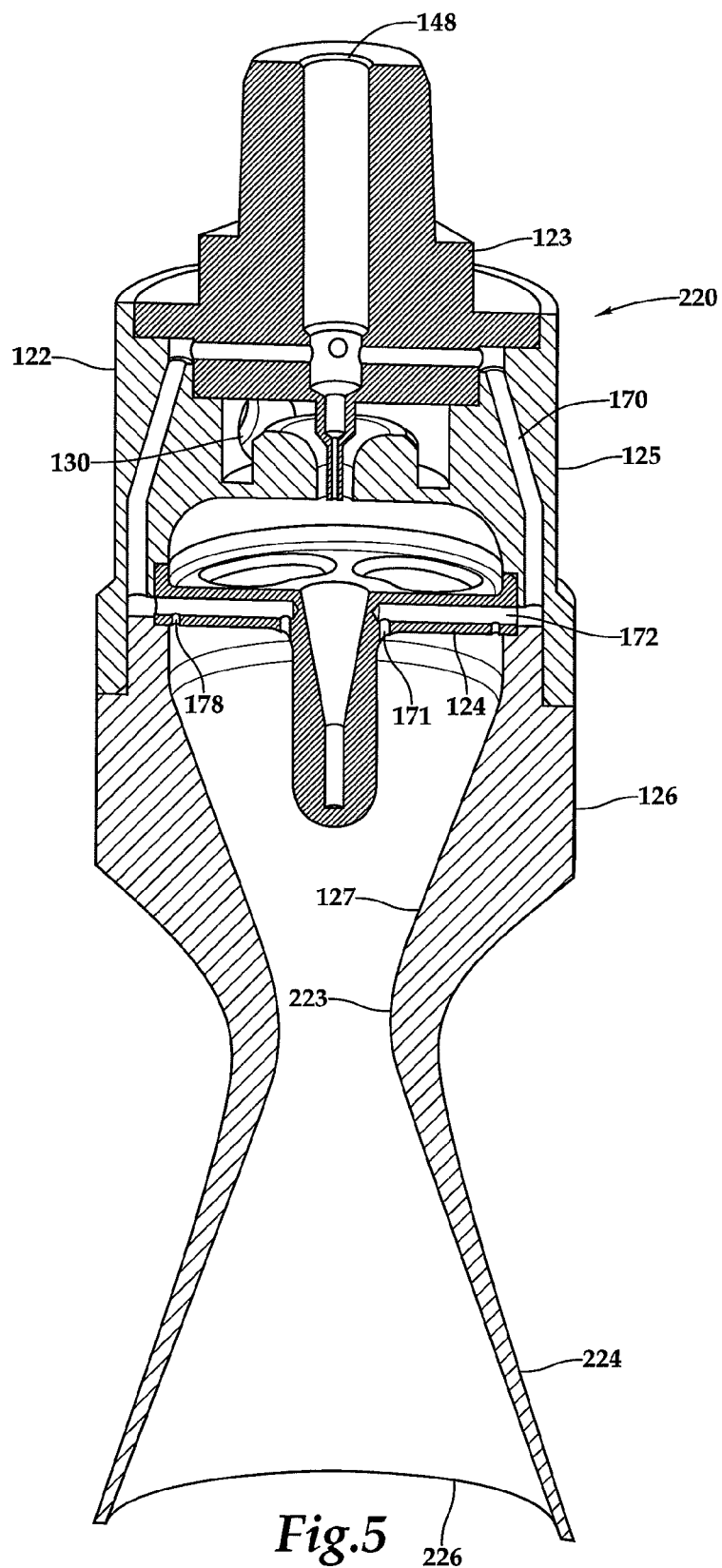
FIG. 5 is a cross-sectional view of a reaction control system thruster employing the acoustical resonance igniter of FIG. 3.

Referring more particularly to FIGS. 1-5 wherein like numbers refer to similar parts, an acoustical resonance igniter 20 is best shown in FIG. 1. The acoustic igniter 20 comprises three parts: an injector subassembly 22, a resonator subassembly 24, and a combustion chamber subassembly 26. The ignition subassembly 22 comprises an oxygen manifold 28 connected to a source 30 of high-pressure oxygen gas. The oxygen manifold 28 leads to a converging nozzle 32 which empties into an ignition chamber 34 formed between the injector subassembly 22 and the resonator subassembly 24. The high-pressure (e.g., 30-1200 psi) oxygen source 30 supplies gaseous oxygen to the oxygen manifold 28 where the gaseous oxygen is accelerated through a sonic nozzle 29. The sonic nozzle 29 has a nozzle outlet 31 from which an under-expanded jet of sonic or supersonic gas is expelled. The under-expanded jet is directed toward an opening 36 which leads into a resonance cavity 38 formed by axially extending central body portions 39 of the resonance subassembly 24. The resonance cavity opening 36 is positioned opposite and spaced from the nozzle outlet 31.

The resonance cavity 38 has two sections: a first frustoconical portion 40 leading to a second shorter cylindrical section 42. The supersonic flow of oxygen gas fills the resonance cavity 38 and sets up an oscillating shock front around the opening 36 which drives a resonating shock driven pressure wave which travels up and down the resonance cavity heating the gas near the bottom of the cylindrical section 42 through a known gas dynamic phenomenon. With respect to the relationship of the dimensions on the sonic nozzle 29, the spacing between the nozzle and the opening 36 of the resonance cavity 38, the taper of the frustoconical portion 40 in the cylindrical section 42 is given by Kessaev et al. U.S. Pat. No. 6,199,370 which is incorporated herein by reference. Generally the arrangement shown in FIG. 1 is effective for a wide range of gases e.g., He, $H_2$, and $O_2$.

Liquid propellant e.g., RP-1 or kerosene, is injected through a pintle 44 which extends coaxial with the sonic nozzle 29 to the outlet 31. The pintle 44 has a central liquid flow path 46 leading to an outlet 47 which is connected to a source of liquid propellant 48 which is pressurized. Because the liquid propellant is injected coaxial with the gaseous oxygen which has a high velocity (i.e. ~330 m/s at 20° C. for $O_2$) brought about by the sonic nozzle 29, the shear interaction of the gaseous oxygen and the liquid propellant 48 causes the liquid propellant to break up into small droplets which are carried into the resonance cavity where the small droplets or fuel vapors are ignited by the heated oxygen produced within the resonance cavity 38.

In a typical test sequence gaseous oxygen was introduced into an oxygen manifold 28 with a time lead of approximately 100 ms allowing oxygen to flow from the nozzle 29 and into the resonance cavity 38 which preheated the oxygen within the resonance cavity 38. The liquid propellant, RP-1, is injected to the coaxial pintle 44 at a mixture ratio of 40:1 (mass flow of oxygen to mass flow RP-1). Ignition occurred in about 10 ms. A test apparatus had a sonic nozzle diameter of 0.076 inches, and the spacing between the nozzle exit plane 50 and the plane 52 of the resonance cavity opening 36 is 0.195 inches. The frustoconical portion 40 of the resonance cavity 38 has a base diameter of 0.143 inches and tapers for a distance of 0.292 inches to a diameter of 0.040 inches. The cylindrical section 42 arranged coaxially with the frustoconical portion 40 extends a further 0.200 inches. The oxygen manifold 28 before the converging sonic nozzle 29 has a diameter of 0.242 inches. The gaseous oxygen mass flow rate was 0.0725 lbm/sec, and the fuel flow mass rate was 0.00180 lbm/sec.

Following ignition, heated oxygen and the products of combustion flow out of the ignition chamber 34 through four openings 54 in a flange 56 surrounding the resonance cavity opening 36. The flange 56 is mounted over the combustion chamber subassembly 26 by a supporting circumferential fuel feed portion 57 of the flange 56 and supports the resonance cavity 38 over the combustion chamber 55 as shown in FIG. 1 by four isthmus portions 59 of the flange 56. The isthmus portions are between the flange openings 54. The flange is clamped between the injector subassembly 22 and the combustion chamber subassembly 26 and divides the ignition chamber 34 from the combustion chamber 55 which defines a combustion space. All the combustion gases formed in the ignition chamber 34 flow through the openings 54 in the flange 56 to enter the combustion chamber 55. Secondary fuel of 0.0709 lbm/sec. can be injected in the combustion chamber 55 to bring the mixture ratio of oxidizer and fuel to about 1:1 to raise the temperature of the gas to form a better ignition torch for ignition of the main propellant flows in the main chamber of a rocket engine. Other propellant mass flow rates and mixture ratios (0.6<O/F<40) can also be used.

The secondary fuel is also arranged to provide cooling to support flange 56, the exterior surface 58 of the axially extending portion 39 of the resonance subassembly 24, and the interior wall 60 of the combustion chamber 55. Secondary fuel is supplied through an inlet port 62 which feeds a distribution annulus 64 formed between the combustion chamber exterior wall 66 and a surrounding fixture 68. From the annulus 64 sloping holes 70 in the circumferential fuel feed portion 57 connect the fuel supply to four passageways 72 in the plane of the resonance cavity support flange 56. The passageways 72 are formed within the interior 74 of the resonance cavity flange 56, thus cooling the flange and the four isthmuses 59 between the openings 54 in the flange. Four fuel ports 71 are formed which extend from the radial innermost ends of the passageways 72 to the lower surface 76 of the support flange 56 immediately adjacent the exterior surface 58 of axially extending portion 39 of the resonance cavity subassembly 24. The four fuel ports 71 provide film cooling with four fuel jets 77 of the exterior surface 58 which surrounds the axially extending portions 39 of the resonator subassembly 24. An additional four fuel ports 78 are formed which extend from the passageways 72 to the lower surface 76 of the support flange 56 and are arranged near the outer circumference of the combustion chamber 55. The additional fuel ports 78 are arranged with slot shaped nozzles 79, shown in FIG. 2, to form four fan-shaped spray patterns 80 of fuel which cover the interior wall 60 of the combustion chamber 55.

A flight-configured acoustic resonance igniter 120 is shown in FIG. 3. Again the igniter 120 comprises three parts: an injector subassembly 122, a resonator subassembly 124, and a combustion chamber subassembly 126. The combustion chamber subassembly 126 is integrally formed with a triangular mounting flange 121 for mounting the igniter 120 to the main combustion chamber. The injector subassembly 122 is comprised of two parts: a liquid propellant manifold 123 and a gas supply structure 125, which forms an oxygen manifold 128 and a sonic nozzle 129. The oxygen manifold 128 is connected to a source of compressed gaseous oxygen 130. Compressed oxygen from the oxygen manifold 128 is accelerated by the converging nozzle 132 leading to the sonic nozzle outlet 131 and forms an under-expanded jet 133 which is injected into an ignition chamber 134 formed between the gas supply structure 125 and the resonator subassembly 124. The under-expanded jet 133 extends to the opening 136 of the resonance cavity 138 within an axially extending portion 139 of the resonator subassembly 124. The resonance cavity 138 has the same configuration as the resonance cavity 38 with the frustoconical portion 140 and a short cylindrical section 142. The action of the under-expanded jet 133 fills the resonance cavity 138 with oxygen gas and forms an unstable oscillating shockwave about the opening 136 which drives shockwaves into the resonance cavity heating the oxygen gas within the resonance cavity 138, particularly in the short cylindrical section 142.

The liquid propellant manifold 123 is connected to the source 148 of pressurized liquid propellant e.g., kerosene or RP-1. Portions of the manifold 123 form a pintle 144 which extends into the sonic nozzle 129. The pintle provides a central liquid flow path 146 which has an outlet 141 which extends to a nozzle exit plane 150 which is spaced from the plane 152 of the resonance cavity opening 136. The manifold 123 has inlet ports 162 connected to -four lateral conduits 164 which supply liquid propellant to four downcomers 170. The downcomers 170 supply the four passageways 172 in the interior 174 of the flange 156 of the resonator subassembly 124. The passageways 172 extend to the isthmuses 159 between the openings 154 in the flange 156. The acoustical resonator subassembly 124 is best shown in FIG. 4 where the subassembly is cut away along a horizontal and a vertical plane to show the four passageways 172 extending from the circumferential support edge 157 radially inwardly toward the resonance cavity 138. Four openings 171, best shown in FIG. 4, extend from the passageways 172 to the lower surface 176 of the flange 156 adjacent the exterior surface 158. The exterior surface 158 surrounds the axially extending portion 139 of the resonator subassembly 124 which defines the resonance cavity 138. The four fuel ports 171 provide film cooling with four fuel jets of the exterior surface 158 of the axially extending portion 139 of the resonator subassembly 124. An additional four passageways 178 which extend from the passageways 172 to the lower surface 176 of the support flange 56 are arranged near the outer circumference of the combustion chamber 155 and adjacent to the interior wall 160 of the combustion chamber. These additional four passageways 178 are also arranged with fan shaped nozzles (not illustrated) according to the arrangement of the nozzles 79 shown in FIG. 2.

A reaction control system thruster 220 is shown in FIG. 5. The thruster is built around the flight configured acoustic igniter 120. However, instead of being used to form an igniter jet to ignite a larger engine, the igniter itself provides the hot gas flow for the thruster 220. In the RCS thruster 220 the combustion chamber 155 sonic nozzle is formed by a throat 223. The throat 223 has a minimum area in a plane perpendicular to the nozzle axis at the throat. The throat 223 opens into a diverging nozzle formed by the expansion bell 224. The bell exit area is defined by an exit plane which extends perpendicular to the nozzle axis at the exit of the bell 224. The bell exit area is 20 to 80 times an area defined by the throat 223. The acoustic resonance igniter 120 is designed with an allowable operation time of three seconds which is more than sufficient to accomplish the ignition of a larger thrust chamber. RCS thrusters, on the other hand, are normally also designed for short pulses to provide accurate controlled angular and translational movement of the spacecraft, and may be called upon for longer burns used in velocity trim of trajectories and to execute small but significant orbital adjustments.

To provide for continuous functioning of the RCS thruster 220, additional film cooling may be provided by providing additional passageways 171, 178 which can be fed from annular plenums arranged surrounding the resonance cavity 138 at the radius of the openings 171, and at the radius of the openings 174 adjacent the interior surface 160 of the combustion chamber 155. Such a modification of the resonance subassembly might require a two-part assembly or an investment casting in order to allow for the manufacture of the annular plenums. Additional downcomers and larger flow passages might also be required. To maximize performance of the RCS thruster 220, the film cooling could be modified to adjust the mixture ratio to be closer to stoichiometric. Cooling of the combustion chamber wall 160 and the exterior surface 158 of the axially extending portion 139 of the resonator subassembly 124 may be assisted by thermal coatings to limit the heat transfer to the combustion chamber subassembly 126. High temperature materials such as niobium and carbon carbon can be used to form the expansion bell 224 or even for the combustion chamber wall if a mixture ratio with a low enough flame temperature is selected for the RCS thruster 220.

Suitable materials for the construction of the acoustical resonance igniter 20 include copper for the injector subassembly 22 and the combustion chamber 55, stainless steel for the liquid fuel manifold 123 and molybdenum for the resonator subassembly 24, 124.

It should be understood that the acoustic resonance igniter is most effective with a lightweight monatomic gas such as helium. A lightweight diatomic gas such as hydrogen is also very effective. Heavier monatomic gases such as neon, argon, and krypton or heavier diatomic gases such as nitrogen and oxygen are also effective sources of ignition. Heavier, polyatomic gases such as nitrous oxide are generally not effective because of the many molecular vibration modes which absorb thermal energy in a way which is not conducive to increasing gas temperature. Generally, a liquid propellant combination will includes two liquids, one of which can be heated to form a reasonable low molecular weight diatomic gas (e.g., oxygen or hydrogen). Such a liquid propellant combination will particularly benefit from an acoustic resonance igniter because the propellants themselves can readily provide the source of high-pressure gas by isolating a small quantity of propellant such as liquid oxygen or hydrogen, and allowing it to be warmed by an electric heater or a thermal mass to form the pressurized ignition gas. In this way a space vehicle employing liquid oxygen and a hydrocarbon such as RP-1 in its main propulsion system could also use the same propellants in an reaction control system where the infrequent and relatively low mass flow of propellant suitable for acoustic resonance ignition could be supplied by isolating and heating some quantity of liquid oxygen or hydrogen.

Other possible propellant combinations include gaseous hydrogen and liquid nitrous oxide, $N_2O$, where the resonance gas is the fuel and the liquid injected through the pintle 44 is the oxidizer nitrous oxide, and the nitrous oxide is also used to cool the flange 56, the residence cavity exterior surface 58, and the combustion chamber interior wall 60. Gaseous hydrogen and liquid nitrous oxide where a hydrocarbon fuel has been added to the nitrous oxide such as described in US Publication 20090133788, which is incorporated herein by reference, could also be used to form an RCS thruster. With reference to nitrous oxide at room temperature, it has a vapor pressure of approximately 850 psi, and has a critical temperature of 97.5° F. so, when described as a liquid, it may in fact be a supercritical fluid, or a mixture of liquid and gas as pressure is reduced and the liquid boils. (for example alcohol, gasoline, or jet fuel) or other liquid fuels (for example liquid hydrogen, liquid methane, or liquid propane) can be used with gaseous oxygen for example alcohol, gasoline, or jet fuel. Alternatively, liquid oxidizers (cryogenic oxygen or nitrous oxide) can be used with gaseous hydrogen. Another possible propellant combinations include gaseous hydrogen and an aqueous solution of Hydroxylammonium nitrate, or LMP-103S a mixture of Ammonium DiNitramide (ADN) 60-65%, methanol 15-20%, ammonia 3-6% and water.

It should be understood that the minimum pressure for the resonance gas is simply that necessary to create choked flow in the sonic nozzle, and the minimum pressure for the liquid which is coaxially injected is simply a pressure sufficient to inject liquid into the gas jet. The acoustic igniter when used to ignite a rocket engine gas generator or the like may be required to operate against a constant back pressure which will dictate the minimum pressures for the resonance gas which must expand and form a sonic or hypersonic jet and the shock front which generates the heating within the resonance cavity.

In sizing the total mass flow for an acoustic resonance igniter of this invention it is understood that the total mass flow is simply the total gas flow plus the total liquid flow. The gas flow is determined by the gas pressure in the net area of the sonic nozzle after subtracting the area of the liquid injection pintle, and the fuel flow through the pintle and through the film cooling jets which is determined by the size of the jets' openings and the pintle opening and the liquid pressure. The amount of liquid injected through the pintle controls the mixture ratio in the ignition chamber, and the amount of liquid injected through the film cooling jets controls the global mixture ratio in the combustion chamber.

It should be understood that the essentially blind resonance cavity may have an opening from which hot gas escapes without preventing the operation of the resonance cavity described above if the opening is sufficiently small. However, such an opening is not necessary in the embodiments shown in the figures.

It is understood that the invention is not limited to the particular construction and arrangement of parts herein illustrated and described, but embraces all such modified forms thereof as come within the scope of the following claims.

I claim:

1. An acoustic resonance igniter for a rocket engine comprising:
   a source of compressed gas;
   at least one source of pressurized liquid propellant;
   a gas nozzle defining a nozzle axis, the gas nozzle connected to a gas chamber connected to the source of compressed gas;
   a pintle defining an axis, portions of the pintle forming an axial liquid flow path connected to the source of pressurized liquid propellant, the pintle positioned within the gas nozzle aligned along the nozzle axis, and having portions defining a liquid propellant outlet directed along the axis of the pintle;
   a flange having an upper surface and a lower surface, and supporting a central body, wherein portions of the central body define a resonance cavity, the resonance cavity having a resonance cavity opening in the upper surface of the flange which is spaced from the gas nozzle along the nozzle axis;
   an ignition chamber defined between the gas nozzle and the resonance opening in the upper surface of the flange;
   wherein the pintle liquid propellant outlet is directed along the axis of the gas nozzle at the resonance cavity opening in the upper surface of the flange;
   a combustion chamber separated from the ignition chamber by the flange, and having an interior wall defining a combustion space;
   wherein the gas nozzle and the resonance cavity are arranged to produce hot gas in the resonance cavity, and the pintle is arranged to supply liquid propellant to the hot gas to initiate combustion;
   wherein portions of the flange define a plurality of first openings through the flange which are separated by support members formed by portions of the flange which extend from the central body to portions of the flange which are radially beyond the first openings in the flange, wherein the first openings and support members are positioned radially outwardly from the resonance cavity opening, so that gases can flow from the ignition chamber through the first openings into the combustion chamber;
   wherein the flange has portions defining internal passageways along the support members, the internal passageways connected to the at least one source of pressurized liquid propellant;
   wherein the flange has portions which form a plurality of second openings extending to the lower surface of the flange, said second openings arranged to provide for flow of the pressurized liquid propellant in the internal passageways along the support members, and to spray the pressurized liquid propellant on exterior surfaces of the central body and on the combustion chamber interior wall.

2. The igniter of claim 1 wherein the at least one source of compressed gas is a source of oxygen.

3. The igniter of claim 2 wherein the source of compressed gas is a source of oxygen at 30-1200 pounds per square inch (psi).

4. The igniter of claim 2 wherein the at least one source of pressurized liquid propellant is a source of pressurized hydrocarbon.

5. The igniter of claim 4 wherein the at least one source of pressurized liquid propellant is a source of pressurized Rocket Propellant-1 (RP-1) or kerosene.

6. The igniter of claim 1 wherein the source of compressed gas is a source of hydrogen.

7. The igniter of claim 6 wherein the at least one source of pressurized liquid propellant is a source of a pressurized liquid oxidizer.

8. The igniter of claim 7 wherein the source of a pressurized liquid oxidizer is selected from the group of liquid oxidizers consisting of: hydroxylammonium nitrate, nitrous oxide and hydrogen peroxide.

9. A reaction control thruster comprising:
a source of compressed gas;
at least one source of pressurized liquid propellant;
a gas nozzle defining a nozzle axis, the gas nozzle connected to a gas chamber connected to the source of compressed gas;
a pintle which defines an axis aligned along the nozzle axis, wherein portions of the pintle form an axial liquid flow path connected to the at least one source of pressurized liquid propellant, the pintle positioned within the gas nozzle aligned along the gas nozzle axis, and having portions defining a liquid propellant outlet directed along the gas nozzle axis;
a flange having an upper surface and a lower surface and supporting a central body having exterior surfaces, wherein portions of the central body define a resonance cavity, the resonance cavity defining a resonance cavity opening in the upper surface of the flange which is spaced from the gas nozzle along the nozzle axis;
an ignition chamber defined between the nozzle and the resonance cavity opening; a combustion chamber separated from the ignition chamber by the flange, and having an interior wall defining a combustion space;
wherein the gas nozzle and the resonance cavity are arranged to produce hot gas in the resonance cavity, and the pintle is arranged to supply liquid propellant to the hot gas to initiate combustion;
wherein portions of the flange define a plurality of first openings through the flange which are separated by support members formed by portions of the flange which extend from the central body to portions of the flange which are radially beyond the first openings in the flange, wherein the first openings and support members are positioned radially outwardly from the resonance cavity opening, so that gases can flow from the ignition chamber through the flange first openings into the combustion chamber;
wherein the flange has portions defining internal passageways along the support members, the internal passageways connected to the at least one source of pressurized liquid propellant;
wherein the flange has portions which form a plurality of second openings extending to the lower surface of the flange, said second openings arranged to provide for flow of the pressurized liquid propellant in the internal passageways along the support members, and to spray the pressurized liquid propellant on the exterior surfaces of the central body and on the combustion chamber interior wall; and
the combustion chamber having a converging section leading to a sonic nozzle defining a minimum sonic nozzle cross section area, the nozzle opening into a diverging expansion bell having an exit area which is at least 10 times greater than the minimum sonic nozzle cross section area.

10. The reaction control thruster of claim 9 wherein the at least one source of compressed gas is a source of oxygen.

11. The reaction control thruster of claim 10 wherein the source of compressed gas is a source of oxygen at 30-1200 pounds per square-inch (psi).

12. The reaction control thruster of claim 11 wherein the at least one source of pressurized liquid propellant is a source of pressurized hydrocarbon.

13. The reaction control thruster of claim 12 wherein the at least one source of pressurized liquid propellant is a source of pressurized Rocket Propellant-1 (RP-1) or kerosene.

14. The reaction control thruster of claim 9 wherein the source of compressed gas is a source of hydrogen.

15. The reaction control thruster of claim 14 wherein the at least one source of pressurized liquid propellant is a source of a pressurized liquid oxidizer.

16. The reaction control thruster of claim 15 wherein the source of a pressurized liquid oxidizer is selected from the group of liquid oxidizers consisting of: nitrous oxide and hydrogen peroxide.

17. A method of creating a hot gas jet from a combination of at least two propellants comprising the steps of:
creating a source of compressed gas from a first of the propellants; creating a source of pressurized liquid propellant from a second of the propellants;
accelerating compressed gas from the first of the propellants through a sonic nozzle to form a gas jet;
heating a portion of the gas by impinging the gas jet on an opening into an acoustic resonance cavity spaced from the sonic nozzle, so that a portion of the gas in the acoustic resonance cavity is heated above an ignition temperature of the first propellant with the second propellant;
wherein the acoustic resonance cavity is formed in a central body which is supported by a support structure between the sonic nozzle and a combustion chamber defined by a wall so that the central body extends into the combustion chamber; injecting the second of the propellants coaxially with the gas jet so that the second of the propellants enters the acoustic resonance cavity with the heated portion of the gas, and ignites the propellants, to create hot combustion gas from the gas jet and the coaxially injected the second of the propellants;
passing the hot combustion gas through openings in the support structure and around the acoustic resonance cavity into the combustion chamber;
cooling at least part of the support structure by passing at least a portion of the additional flow of pressurized liquid propellant through at least one passageway in the support structure; and
film cooling the combustion chamber wall and an exterior surface of the central body with an additional flow from the source of pressurized liquid propellant from at least one opening in the at least one passageway in the support structure.

18. The method of creating a hot gas jet of claim 17 further comprising the steps of:

expanding the gases from the combustion chamber through a converging section leading to a sonic nozzle defining a minimum sonic nozzle cross section area to form the hot gas jet; and expanding the gases from the combustion chamber converging section into a diverging expansion bell having an exit area which is at least 10 times the sonic nozzle minimum nozzle cross section area, and employing the hot gas jet as part of a Reaction Control System (RCS).

19. The method of creating a hot gas jet of claim 17 wherein creating a source of compressed gas from a first of the propellants comprises:

creating a source of compressed gas from a gas selected from the group of gases consisting of: oxygen, hydrogen, and helium; and wherein the step of creating a source of pressurized liquid propellant from a second of the propellants comprises creating a source of pressurized liquid propellant from a liquid selected from the group of liquids consisting of: a hydrocarbon, nitrous oxide, and hydrogen peroxide.

20. The method of creating a hot gas jet of claim 17 wherein the hot gas jet is used to ignite a rocket engine.

21. The method of creating a hot gas jet of claim 17 wherein the hot gas jet is used to ignite a rocket engine cycle combustion device such as a preburner or gas generator.

22. The method of creating a hot gas jet of claim 17 wherein the hot gas jet is used to ignite a gas turbine.

23. The method of creating a hot gas jet of claim 17 wherein the hot gas jet is used to ignite a furnace.

* * * * *